Patented Jan. 3, 1933

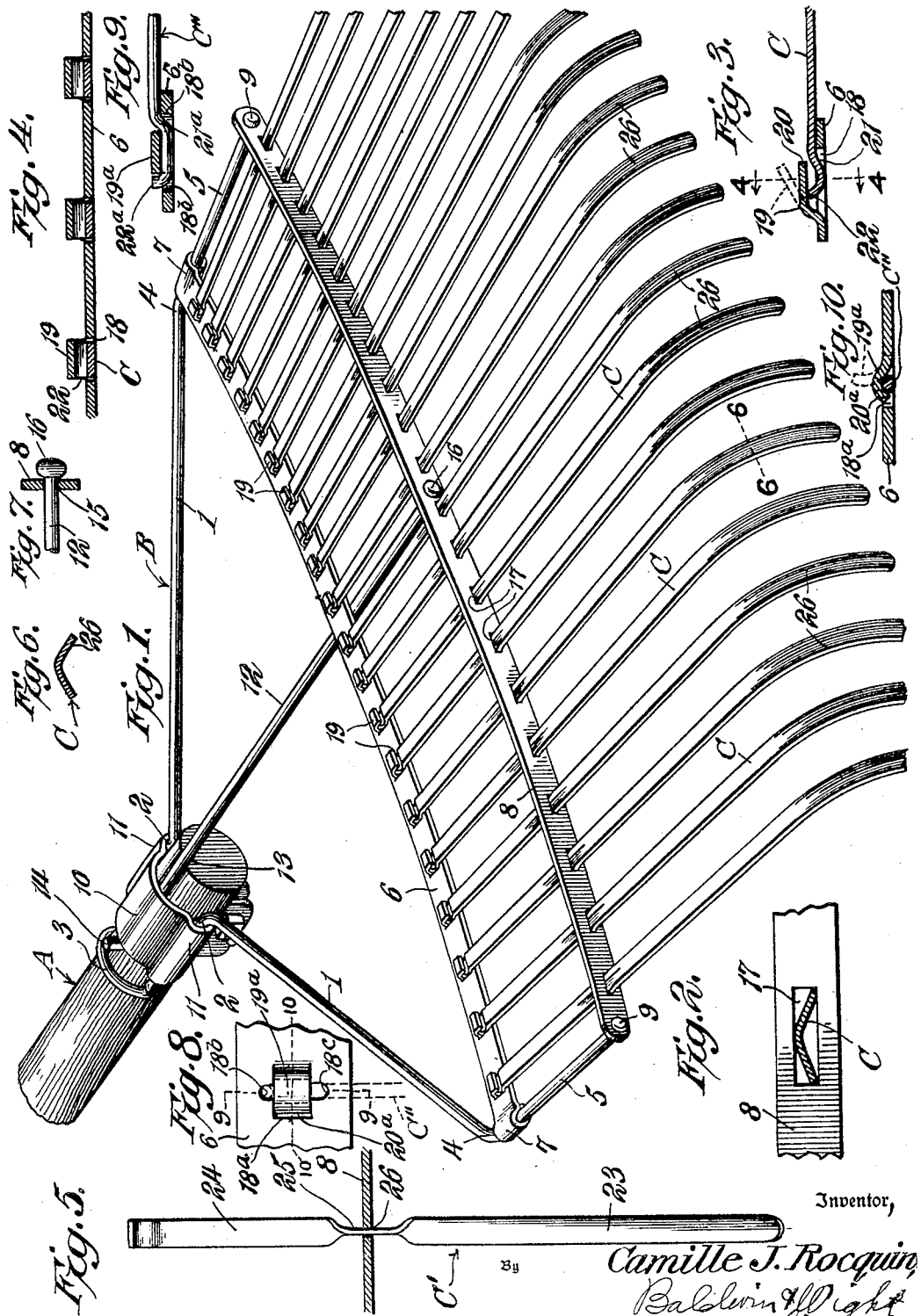

1,892,965

UNITED STATES PATENT OFFICE

CAMILLE J. ROCQUIN, OF NEW ORLEANS, LOUISIANA

RAKE

Application filed January 12, 1932. Serial No. 586,201.

My invention relates to rakes, and more particularly to that type of rake in which a plurality of longitudinally extending flexible tines are connected to a supporting frame which is in turn attached to a handle. It is well known that the tines of rakes of this character are subject to being easily bent and broken off at their points of connection to the associated frame.

It is accordingly an object of the present invention to provide a rake of the general character referred to but in which the tines are so constructed and connected to the frame as to render them less susceptible to bending and breaking at their points of connection to the frame. Another object is to provide a novel form of connection between the rear ends of the tines and the rake frame.

In my prior Patent 1,837,677, I have shown, described and claimed a rake frame structure including a frame stiffening arm interposed between the rake handle and the intermediate portion of the rake frame for preventing undue deflection of the latter when the tines are pressed against the ground with the desired force. An additional object of the present invention is to provide an efficient and simplified form of frame stiffening arm which I have found to be fully as effective and considerably more simple than the form shown in the application referred to. Other objects of the invention will become apparent from a reading of the following description and appended claims and the several views of the accompanying drawing in which:

Figure 1 is a perspective view of the rake embodying the invention;

Figure 2 is a transverse vertical sectional view of a rake tine and showing its mode of connection to the rake front cross bar;

Figure 3 is a fragmentary, longitudinal, vertical sectional view of a rake tine and showing its mode of connection to a rake rear cross bar;

Figure 4 is a fragmentary, vertical, longitudinal sectional view of a rear cross bar;

Figure 5 is a top plan view of a modified form of tine and showing in section the associated part of a front cross bar;

Figure 6 is a sectional view taken on the line 6, 6 of Figure 1;

Figure 7 is a sectional view illustrating the connection between a frame stiffening arm and a front cross bar;

Figure 8 is a fragmentary top plan view of a rear cross bar and a tine of substantially circular cross section connected thereto;

Figure 9 is a sectional view taken on the line 9—9 of Figure 8; and

Figure 10 is a sectional view taken on the line 10—10 of Figure 8.

In the drawing there is shown a rake embodying my invention and including a handle A, a frame B connected to the front end of the handle, and a plurality of tines C connected to the frame B.

The frame B includes a pair of forwardly extending side arms 1—1 which terminate at their rear ends in substantially parallel attaching portions 2—2 disposed on opposite sides of the handle A and connected together by a substantially semi-circular connecting portion 3 fitting over the handle A. The side arms 1—1 are respectively bent adjacent their front ends as at 4—4 to bring the end portions 5—5 of the arms into substantial parallelism.

A flat horizontally disposed rear cross bar 6 is rigidly connected at its respective ends to the parallel end portions 5—5 of the side arms adjacent the bends 4—4, preferably by bending the ends of the cross bar around said parallel portions as at 7—7.

The frame B also includes a front cross bar 8 which is formed of flat material and has its flat sides disposed in a substantially vertical plane. The cross bar is apertured at its opposite ends for the reception of the front ends of the forwardly extending frame portions 5, 5 and is permanently connected to these portions by welding as at 9, 9.

For attaching the frame to the handle I have provided a clamp 10 adapted to fit substantially around the handle and to bind the attaching portions 2, 2 of the side arms against the opposite sides of the handle A. Preferably the clamp is provided with oppositely and longitudinally disposed substantially tubular recesses 11, 11 for receiving the attached portions 2 of the side arms, thus permitting the clamp to fit snugly around the handle.

In accordance with one feature of the invention the rake frame is provided with a frame stiffening arm 12 comprising a round metal rod, the rear end portion of which is adapted to fit into a groove 13 formed in the upper side of the rake handle and to be held in this groove by means of the clamp 10, an up-turned portion 14 on the extreme rear end of the arm 12 being adapted to engage the rear face of the clamp 10 and to prevent displacement of the arm from the groove 13. The forward end of the arm 12 passes through an aperture 15 formed in the front cross bar 8 substantially at the center thereof, and a head 16 on the arm 12 prevents the front cross bar from becoming disengaged from the frame stiffening arm, the relative arrangement of the arm 12 and cross bar 8 being best shown in Figure 7.

A further feature of the invention relates to the novel connections between the tines and the rake frame. As shown in the drawing the front cross bar is provided with a plurality of aligned horizontally disposed slits or openings 17 through which the tines C pass. The rear cross bar is provided with a plurality of struck-up portions providing openings 18 and resultant three-sided tongues 19, the middle or transverse side 20 of each of these tongues facing forwardly and being located behind one of the front cross bar slits 17.

The rear end of each tine C is curved downwardly as at 21 and then upwardly as at 22 as shown in Figure 3. Prior to the connecting of the rear ends of the tines to the rear cross bar the several tongues 19 of the cross bar are bent upwardly into the dotted line position shown in Figure 3. With the tongues in this position the rear ends of the respective associated tines are inserted sidewise under the tongues 19 so as to bring the curved portions 21, 22 of each tine into the associated opening 18 of the cross bar. The tongues 19 are then bent downwardly to the position indicated in full lines in Figure 3, thereby contacting with the associated upwardly turned portions 22 and maintaining the curved rear end portions of each tine in their associated openings 18. When the parts are in the positions shown in full lines in Figure 3 effective and secure connection between the rear ends of the tines and the rear cross bar is effected.

In the modification shown in Figures 8, 9 and 10, tines C'' of substantially circular cross section are connected to the rear cross bar in a manner generally similar to that described above. In the modified construction, the rear cross bar is provided with a plurality of struck-up portions providing openings $18^a$ and resultant three sided tongues $19^a$, the middle side $20^a$ of each of these tongues being disposed transversely of the rear cross bar 6. Preferably, the front and rear sides of the openings $18^a$ are cut out to provide arcuate tine receiving seats $18^b$ and $18^c$ respectively.

The rear end of each tine C'' is curved downwardly as at $21^a$ and then upwardly as at $22^a$ as shown in Figure 9. Prior to the connecting of the rear ends of the tines to the rear cross bar, the tongues $19^a$ are bent upwardly into the dotted line position shown in Figure 10. The rear ends of the tines C'' are then positioned so as to bring the curved portions $21^a$ and $22^a$ of each tine into the associated openings $18^a$ of the cross bar, the seat $18^b$ receiving the curved part $22^a$ and the seat $18^c$ receiving the curved part $21^a$. The tongues $19^a$ are then bent downwardly to the position indicated in full lines in Figure 10, thereby contacting with the associated tines and maintaining the latter securely in place.

As stated above it is desirable to so construct the tines and to so connect them to the frame as to minimize the danger of the tines being broken off while in use. In accordance with the embodiment of the invention illustrated in Figures 1 and 2, the major portion of each tine which extends in front of the front cross bar is flat as in most prior constructions, but that portion which passes through the front cross bar is deformed transversely of the cross bar in the manner shown in Figure 2 so that the over all vertical cross-sectional dimension of each tine is greater in that portion which passes through the associated cross bar opening than in the flat part of the tine extending in front of the cross bar 8. The result of this arrangement is that considerable portions of the tine cross section are located further from the neutral axis of bending at the point where the tines pass through the cross bar than is the case in other parts of the tine. For this reason a much greater resistance to vertical deflection is offered by the deformed portions of the tines with the result that breaking of the latter is prevented. The deformed section also acts to maintain the tines firmly within the opening 17 since the deformed sections will frictionally engage both the upper and lower sides of the openings.

In the modified form of tine shown in Figure 5 the same general relation between the over all vertical cross-sectional dimension of the forwardly extending part of the tine and the portion thereof which passes through the front cross bar is present. In this form, however, the tine C' is shown as having a double twist providing forwardly and rearwardly extending portions 23 and 24 respectively having their greater cross-sectional dimensions disposed horizontally and an intervening portion 25 having its greater cross-sectional dimensions disposed vertically and passing through a vertical opening 26 in the front cross bar. It is obvious that due to the greater vertical extent of the intervening portion 25, bending of the tine at its point of connection to the cross bar is greatly lessened and breaking off is prevented.

As in most rakes of the general character herein described the forward ends of the tines are curved downwardly toward the ground as at 26. I have found that because of the light metal which is usually used in making tines of this character the downward curve at the forward ends of the tines cannot be maintained. Frequently, the curvature of one or more of the tines becomes changed with respect to the curvature of the other tines so that uniform engagement of all the tines with the ground is not possible. In order to remedy this condition I deform the downwardly curved portions of each tine transversely thereof as shown in Figure 6, the result being that the tines will maintain a more permanent set or downward curvature so that the ground engaging ends of the tines will be maintained in alignment after long use.

Although the drawing and description of the present application disclose practical embodiments of the invention, it will be understood that various changes may be made in the construction and arrangement of the parts without departing from the invention as defined in the claims.

I claim:

1. In a rake, the combination with a handle; of a frame connected to the handle and including a pair of spaced side arms; spaced front and rear cross bars connected to said side arms, the front cross bar being provided intermediate its length with an aperture lying in a vertical plane; and a frame stiffening arm secured to the handle and extending below and in contact with the rear cross bar and projecting through the aperture in the front cross bar; and a plurality of forwardly extending tines connected to said cross bars.

2. In a rake, the combination of a frame and a plurality of tines connected thereto at their rear ends and at points intermediate their rear and front ends, the frame being formed adjacent the rear end of each tine with a three-sided struck-up portion providing a resultant opening and a three-sided tongue having its middle or transverse side facing forwardly, the associated tine having its rear end curved downwardly and then upwardly to provide a downwardly extending portion insertable sidewise under said tongue and into the opening.

3. In a rake, the combination of a frame including a pair of spaced forwardly extending side arms, a front cross bar connected to said side arms and a flat horizontally disposed rear cross bar connected to said side arms and being spaced from said front cross bar; and a plurality of forwardly extending tines connected to said cross bars, the rear cross bar being formed adjacent the rear end of each tine with a struck up portion providing a resultant opening and an overhanging tongue, and the rear end of the associated tine having its rear end curved downwardly and extending into said opening and being maintained therein by contact with said over-hanging tongue.

4. In a rake, the combination of a frame including a rear cross bar and a front cross bar spaced from the rear cross bar and formed with a plurality of spaced openings; and a plurality of tines formed of flat material and extending through the respective openings in the front cross bar and being connected to the rear cross bar at their rear ends, the major part of the portion of each tine which extends forward of the cross bar being substantially horizontally disposed, and the over all vertical cross-sectional dimension of said tine being greater in that portion which passes through the cross bar opening than in the adjacent forwardly extending portion.

5. In a rake, the combination of a frame including a rear cross bar and a front cross bar spaced from the rear cross bar and formed with a plurality of spaced openings; and a plurality of tines formed of flat material and extending through the respective openings in the front cross bar and being connected to the rear cross bar at their rear ends, said tines being substantially horizontally disposed and the over all vertical cross-sectional dimensions of the tines being greater in those portions which pass through the cross bar openings than in their adjacent portions.

6. In a rake, the combination of a frame including a front cross bar formed with a plurality of spaced openings; and a plurality of tines formed of flat material and extending through the respective openings and being connected to the frame at their rear ends, said tines being substantially horizontally disposed, and the portion of each tine which extends through the associated cross bar opening being deformed transversely of the tine.

7. In a rake, the combination of a frame including a front cross bar formed with a plurality of spaced openings; and a plurality of tines formed of flat material and extending through the respective openings and being connected to the frame at their rear ends, said tines being substantially horizontally disposed, and the portion of each tine which extends through the associated cross bar opening being deformed transversely of the tine, said portion of each tine frictionally engaging the upper and lower sides of the associated cross-bar opening.

8. In a rake, the combination of a frame including a rear cross bar and a front cross bar spaced from the rear cross bar and formed with a plurality of spaced openings; and a plurality of tines formed of flat material and extending through the respective openings in the front cross bar and being connected to the rear cross bar at their rear ends, the major part of the portion of each tine which extends forward of the cross-bar being substantially horizontally disposed; and each tine being twisted in advance of the cross-bar to provide a portion passing through the associated cross-bar opening having its longer cross-sectional dimension disposed vertically.

In testimony whereof, I have hereunto subscribed my name.

CAMILLE J. ROCQUIN.